(No Model.)

W. W. WAINWRIGHT.
JOURNAL BOX.

No. 525,774.   Patented Sept. 11, 1894.

Witnesses:
E. R. Shipley
M. S. Belden

William W. Wainwright
Inventor
by James W. See
Attorney

UNITED STATES PATENT OFFICE.

WILLIAM W. WAINWRIGHT, OF CONNERSVILLE, INDIANA, ASSIGNOR TO
P. H. & F. M. ROOTS CO., OF SAME PLACE.

JOURNAL-BOX.

SPECIFICATION forming part of Letters Patent No. 525,774, dated September 11, 1894.

Application filed April 14, 1894. Serial No. 507,527. (No model.)

*To all whom it may concern:*

Be it known that I, WILLIAM W. WAINWRIGHT, of Connersville, Fayette county, Indiana, have invented certain new and useful Improvements in Journal-Boxes, (Case B,) of which the following is a specification.

This invention pertains to improvements in journal boxes designed for adjustment both for the purpose of closing up the box upon the shaft as the shaft and box wear loose and for centering the shaft in the housing or hanger or pedestal or bracket or whatever fixed support the box may be mounted in.

My improvements will be readily understood from the following description taken in connection with the accompanying drawings, in which—

Figure 1:
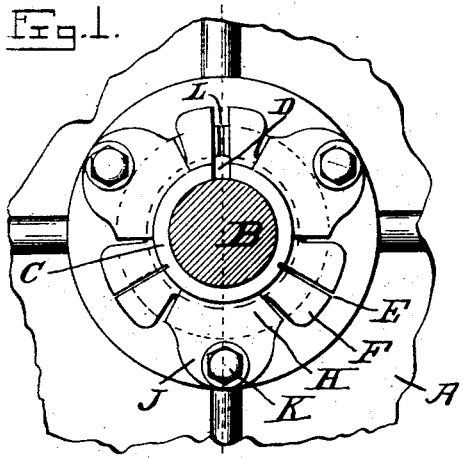
Figure 2:
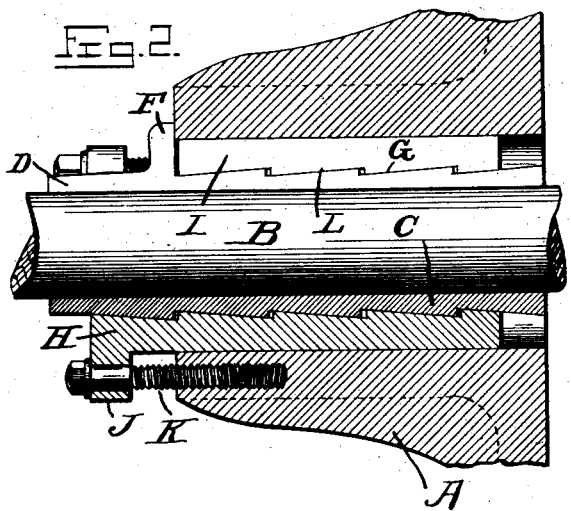
Figure 3:
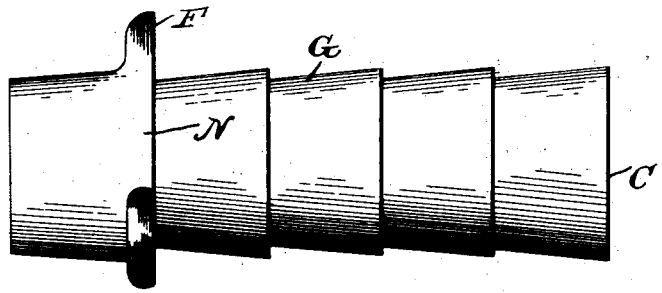
Figure 4:
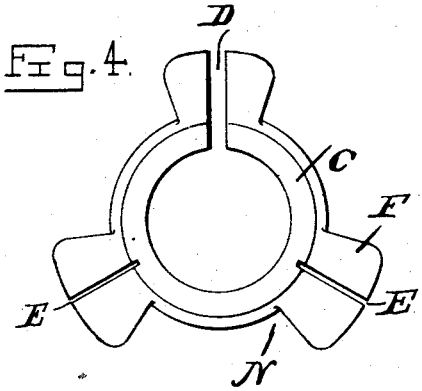
Figure 5:
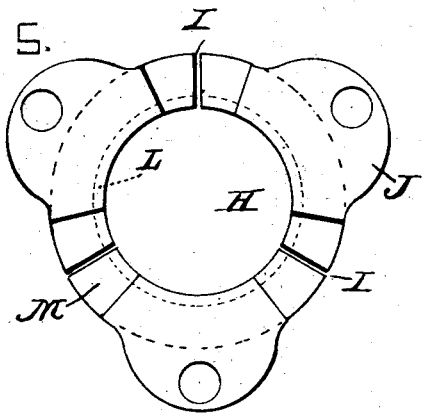

Figure 1, is an end view of a journal box exemplifying my invention; Fig. 2, a vertical longitudinal section thereof; Fig. 3, a side elevation of the bearing-sleeve; Fig. 4, an end view of the bearing-sleeve, and Fig. 5, an end view of the adjusting-sleeve. Figs. 1, 4 and 5 are end views at the left hand end of Figs. 2 and 3.

In the drawings:—A, indicates the housing, hanger, bracket, pedestal or such other fixed support as is to carry the journal box, this housing having a cylindrical bore in the axial line of the intended box, such bore being considerably larger than the shaft when it is run in the box; B, the shaft; C, the bearing-sleeve, bored to fit accurately upon the shaft within the bore of the housing; D, a longitudinal cut entirely through the bearing-sleeve to permit of the sleeve closing up upon the shaft as the shaft and sleeve wear away; E, other longitudinal cuts in the bearing sleeve but not extending to the bore of the sleeve, the object of these cuts E being to weaken the sleeve so that it may more readily be closed inwardly upon the shaft, these cuts not being needed in case the bearing-sleeve is so thin as to permit proper inward springing; F, lugs upon the exterior of the bearing-sleeve extending outwardly beyond the bore in the housing and seating against the face of the housing and serving to prevent the bearing-sleeve going endwise into the bore of the housing beyond the proper distance; G, circumferential grooves turned in the exterior of the bearing-sleeve and having sloping peripheries, producing upon the bearing-sleeve a series of ribs having ratchet-shaped cross-sections, these ribs enlarging in the direction away from the lugs F; H, the adjusting-sleeve having a cylindrical exterior fitting the bore in the housing, the bore of this adjusting-sleeve being grooved to fit the ribs upon the bearing sleeve; I, a series of longitudinal cuts extending entirely through the adjusting-sleeve and dividing the adjusting-sleeve into a series of segmental sections, three in the example; J, a lug projecting outwardly from each of the segmental sections of the adjusting-sleeve at one end of the sleeve, at the end corresponding with the lugs F upon the bearing-sleeve, the adjusting-sleeve projecting at that end outwardly from the bore in the housing so that there is an adjusting distance left between the inner faces of these lugs and the near face of the housing; K, a screw, one for each of the segmental sections of the adjusting-sleeve, engaging the lug J and the housing and serving as a means by which the segmental sections of the adjusting-sleeve may be pushed forcibly farther into the bore of the housing, the end of the adjusting-sleeve farthest from the lugs J preferably setting back from the corresponding face of the housing to permit of endwise adjustment of the adjusting-sleeve without protruding the right-hand end of the adjusting-sleeve beyond the face of the housing; L, the ratchet-shaped ribs in the bore of the adjusting-sleeve intermembering with the ribs upon the bearing-sleeve; M, (Fig. 5) notches or gaps in the end of the adjusting-sleeve, between the lugs J, to permit the lugs F of the bearing-sleeve to take a bearing against the face of the housing, and N, the gaps between the lugs F of the bearing-sleeve to permit of the presence of the lugs J of the adjusting-sleeve.

Viewing the device as seen in Fig. 2, all the parts are to be assumed as in good order, the bearing-sleeve fitting the shaft and the shaft being concentric with the bore in the housing. As the shaft and bearing-sleeve wear, thus loosening the fit of the journal, the screws K may be turned thus urging the adjusting-sleeve inwardly, the inclined ribs of the adjusting-sleeve compressing the bearing-sleeve radially and closing the bearing-sleeve inwardly upon the shaft. Should the greatest amount of wear have taken place in the lower portion of the box, as would be the case where the shaft supported considerable weight, a superior degree of adjustment may be given to the lower section of the adjusting-sleeve thus restoring the shaft to its concentric position with reference to the bore of the housing. Similarly the several sections of the adjusting-sleeve may be independently adjusted to compensate for greater wear in any particular direction and thus bring the shaft to concentric position. Screws K may be removed thus slacking the fit of the parts and permitting the entire box to be withdrawn endwise from the bore of the housing.

This journal-box will be found of special utility in connection with rotary blowers the shafts of whose pistons require to be maintained accurately in position concentric with the bore of the cylinders, and in which also such adjustments as are to be made must be made at one end of the journal-box, the other end of the journal-box being inaccessible.

I claim as my invention—

1. In a journal-box, the combination, substantially as set forth, of a support having a cylindrical bore, a bearing-sleeve disposed therein and having a longitudinal cut and provided with circumferential ribs having ratchet-shaped cross-sections, means for preventing endwise motion of said bearing-sleeve in said bore in one direction, an adjusting-sleeve formed in segmental sections and having a bore grooved to fit the ribs of the bearing-sleeve and having its exterior fitting the bore of said support, and means for adjusting the sections of said adjusting-sleeve endwise independently in the bore of said support.

2. In a journal-box, the combination, substantially as set forth, of a support having a cylindrical bore, a bearing-sleeve therein provided with a longitudinal cut and with exterior circumferential ratchet-shaped ribs and with a lug or lugs engaging the face of said support, a longitudinally cut adjusting-sleeve fitting the bore of said support and having a bore to intermember with the ribs of the bearing-sleeve, and a screw or screws engaging said adjusting-sleeve and support and serving to push the sleeve endwise in the bore of the support.

3. In a journal-box, the combination, substantially as set forth, of a support having a cylindrical bore, a bearing-sleeve therein having a longitudinal cut and having circumferential ratchet-shaped ribs and having near one end lugs engaging the face of said support, an adjusting-sleeve formed in segmental sections and fitting the bore of said support and having a bore intermembering with said ratchet-shaped ribs and having lugs projecting outwardly at one end, and adjusting screws engaging said support and the lugs of said adjusting-sleeve and serving to adjust the sections of the adjusting-sleeve endwise with reference to said bearing-sleeve.

W. W. WAINWRIGHT.

Witnesses:
E. D. JOHNSTON,
GEO. H. FULLERTON, Jr.